US007385719B2

(12) United States Patent
Ohno et al.

(10) Patent No.: US 7,385,719 B2
(45) Date of Patent: Jun. 10, 2008

(54) DATA RECEIVING APPARATUS, METHOD AND STORAGE MEDIUM THEREFOR

(75) Inventors: Tomoyuki Ohno, Kanagawa (JP); Yoshikazu Shibamiya, Kanagawa (JP); Shigeki Mori, Saitama (JP); Shuntaro Aratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 09/986,253

(22) Filed: Nov. 8, 2001

(65) Prior Publication Data

US 2002/0062487 A1 May 23, 2002

(30) Foreign Application Priority Data

Nov. 17, 2000 (JP) .............................. 2000-351992

(51) Int. Cl.
*G06F 15/00* (2006.01)
(52) U.S. Cl. ..................... 358/1.15; 358/1.9; 358/1.18; 358/296; 348/552; 348/553
(58) Field of Classification Search ............... 358/1.15, 358/296, 1.9, 1.18; 348/552, 553
See application file for complete search history.

(56) References Cited

U.S. PATENT DOCUMENTS

| 4,626,926 | A | * | 12/1986 | Nakamura | .................. | 358/296 |
| 4,635,132 | A | * | 1/1987 | Nakamura | .................. | 358/296 |
| 5,488,423 | A | * | 1/1996 | Walkingshaw et al. | ....... | 725/24 |
| 5,594,426 | A | * | 1/1997 | Ushijima et al. | ...... | 340/825.02 |
| 5,886,732 | A | * | 3/1999 | Humpleman | ................. | 725/49 |
| 6,005,482 | A | * | 12/1999 | Moran et al. | ............ | 340/568.8 |
| 6,091,881 | A | * | 7/2000 | Kamikubota | ................. | 386/46 |
| 6,111,613 | A | * | 8/2000 | Sasano et al. | ............. | 348/468 |
| 6,175,861 | B1 | * | 1/2001 | Williams et al. | ............ | 709/217 |
| 6,273,535 | B1 | | 8/2001 | Inoue et al. | ................... | 347/3 |
| 6,366,359 | B1 | * | 4/2002 | Garland | ..................... | 358/1.15 |
| 6,490,052 | B1 | * | 12/2002 | Yanagidaira | ............... | 358/1.15 |
| 6,652,174 | B1 | * | 11/2003 | Mann et al. | ................ | 400/691 |
| 6,690,481 | B1 | * | 2/2004 | Yeung et al. | .............. | 358/1.15 |
| 6,695,494 | B1 | * | 2/2004 | Ihara et al. | .................... | 400/76 |

(Continued)

FOREIGN PATENT DOCUMENTS

JP              10-226139            8/1998

(Continued)

OTHER PUBLICATIONS

Computer Translation of Japenes Patent Document No. 07-076155, Masaaki Nabeta, Mar. 20, 1995.*

(Continued)

*Primary Examiner*—Twyler Lamb Haskins
*Assistant Examiner*—Mark R. Milia
(74) *Attorney, Agent, or Firm*—Fitzpatrick, Cella, Harper & Scinto

(57) ABSTRACT

In case the digital broadcasting wave contains printable contents data, the invention multiplexes a message, a mark or an icon on the display screen of the currently viewed program or outputs an audio message to inform the user of the presence of such contents data. The invention prevents a situation where the contents data cannot be or are not printed even though the data are transmitted, and allows the user to correctly prepare the type or number of sheets in advance in the printer.

11 Claims, 17 Drawing Sheets

U.S. PATENT DOCUMENTS

| | | | |
|---|---|---|---|
| 6,763,396 B2 * | 7/2004 | Torikai | 709/250 |
| 6,791,704 B1 * | 9/2004 | Moreau et al. | 358/1.15 |
| 6,870,571 B1 * | 3/2005 | Narushima et al. | 348/552 |
| 2001/0045966 A1 | 11/2001 | Inoue et al. | 347/3 |
| 2004/0179046 A1 | 9/2004 | Inoue et al. | 347/3 |

FOREIGN PATENT DOCUMENTS

| | | |
|---|---|---|
| JP | 10-229534 | 8/1998 |
| JP | 11-112914 | 4/1999 |
| JP | 11-112914 A | 4/1999 |
| JP | 11-237966 | 8/1999 |
| JP | 11-341423 | 12/1999 |
| JP | 2000-92416 | 3/2000 |

OTHER PUBLICATIONS

Official Action, dated Feb. 5, 2007, for corresponding European Application No. 01 309 492.5-1522.

* cited by examiner

FIG. 2

| program_map_section(){ | THE NUMBER OF BITS | VALUE |
|---|---|---|
| (I) table_id | 8 | 0x02 |
| section_syntax_indicator | 1 | 1(binary) |
| '0' | 1 | 0(binary) |
| reserved | 2 | 11(binary) |
| section_length | 12 | 0x035 |
| program_number | 16 | 0x0071 |
| reserved | 2 | 11(binary) |
| version_number | 5 | 00000(binary) |
| current_next_indicator | 1 | 1(binary) |
| section_number | 8 | 0x00 |
| last_section_number | 8 | 0x00 |
| (II) reserved | 3 | 111(binary) |
| PCR_PID | 13 | 0x1FF |
| reserved | 4 | 1111(binary) |
| program_info_length | 12 | 0x000 |
| (III) stream_type | 8 | 0x02 |
| reserved | 3 | 111(binary) |
| elementary_PID | 13 | 0x0100 |
| reserved | 4 | 1111(binary) |
| ES_info_length | 12 | 0x003 |
| stream_identifier_descriptor(){ | | |
| descriptor_tag | 8 | 0x52 |
| descriptor_length | 8 | 0x01 |
| component_tag | 8 | 0x00 |
| } | | |
| (IV) stream_type | 8 | 0x0F |
| reserved | 3 | 111(binary) |
| elementary_PID | 13 | 0x0110 |
| reserved | 4 | 1111(binary) |
| ES_info_length | 12 | 0x003 |
| stream_identifier_descriptor(){ | | |
| descriptor_tag | 8 | 0x52 |
| descriptor_length | 8 | 0x01 |
| component_tag | 8 | 0x10 |
| } | | |

TO FIG. 3

FIG. 3

FROM FIG. 2

```
      stream_type                       8      0x0D
      reserved                          3      111(binary)
      elementary_PID                   13      0x1F40
      reserved                          4      1111(binary)
      ES_info_length                   12      0x00B
       stream_identifier_descriptor(){
         descriptor_tag                 8      0x52
         descriptor_length              8      0x01
         component_tag                  8      0x40
       }
       data_component_descriptor(){
         descriptor_tag                 8      0xFD
         descriptor_length              8      0x06
         data_component_id             16      0x0007
(V)      additional_arib_bxml_info(){
         transmission_format            2      00(binary)
         entry_point_flag               1      1(binary)
         auto_start_flag                1      0(binary)
         document_resolution            4      0011(binary)
         use_xml                        1      0(binary)
         default_version_flag           1      1(binary)
         independent_flag               1      1(binary)
         style_for_tv_flag              1      1(binary)
         reserved                       4      1111(binary)
         reserved                       8      0xFF
         ondemand_retrieval_flag        1      1(binary)
         file_storable_flag             1      0(binary)
         reserved                       6      111111(binary)
       } stream_type                       8      0x1D
      reserved                          3      111(binary)
      elementary_PID                   13      0x1F41
      reserved                          4      1111(binary)
      ES_info_length                   12      0x003
(VI)   stream_identifier_descriptor(){
         descriptor_tag                 8      0x52
         descriptor_length              8      0x01
         component_tag                  8      0x50
       }
      CRC_32                           32
}
```

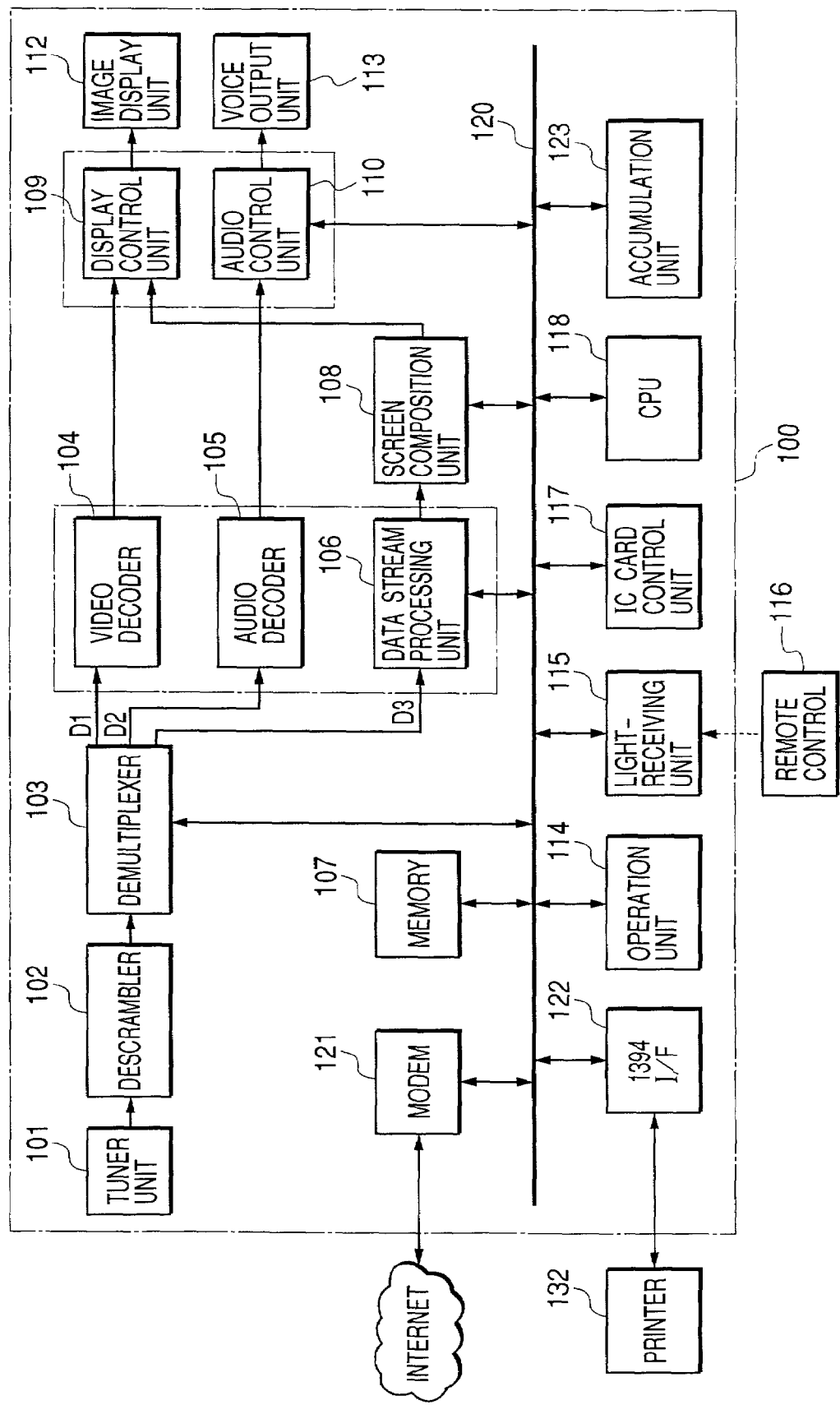

FIG. 8

| | THE NUMBER OF BITS | VALUE |
|---|---|---|
| stream_type | 8 | 0x1D |
| reserved | 3 | 111(binary) |
| elementary_PID | 13 | 0x1F41 |
| reserved | 4 | 1111(binary) |
| ES_info_length | 12 | 0x00A |
| stream_identifier_descriptor(){ | | |
|   descriptor_tag | 8 | 0x52 |
|   descriptor_length | 8 | 0x01 |
|   component_tag | 8 | 0x50 |
| } | | |
| data_component_descriptor(){ | | |
|   descriptor_tag | 8 | 0xFD |
|   descriptor_length | 8 | 0x05 |
|   data_component_id | 16 | 0x000F |
| print_content_info(){ | | |
|   transmission_format | 2 | 00(binary) |
|   reserved | 2 | 11(binary) |
|   document_size | 4 | 0100(binary) |
|   document_type | 4 | 0000(binary) |
|   document_volume | 8 | 0x06 |
|   content_storable_flag | 2 | 01(binary) |
|   reserved | 2 | 11(binary) |
| } | | |
| } | | |

FIG. 9 transmission_format

| 00 | DATA CAROUSEL TRANSMISSION SYSTEM AND EVENT MESSAGE TRANSMISSION SYSTEM |
|---|---|
| 01 | reserved |
| 10 | reserved |
| 01 | reserved | document_size

| 0000 | PRINT DATA OF TWO OR MORE SIZE AND RESOLUTION ARE CONTAINED |
|---|---|
| 0001 | A1 |
| 0010 | A2 |
| 0011 | A3 |
| 0100 | A4 |
| 0101 | A5 |
| 0110 | B1 |
| 0111 | B2 |
| 1000 | B3 |
| 1001 | B4 |
| 1010 | B5 |
| 1011 | POSTCARD |
| 1100-1111 | reserved | document_type

| 0000 | PRINT DATA OF TWO OR MORE KINDS ARE CONTAINED |
|---|---|
| 0001 | JPEG IMAGE |
| 0010 | PNG IMAGE |
| 0011 | TEXT DATA |
| 0100-1111 | reserved | content_storable_flag

| 00 | ACCUMULATION IS IMPOSSIBLE |
|---|---|
| 01 | ACCUMULATION IS POSSIBLE |
| 10 | reserved |
| 11 | reserved |

FIG. 10A
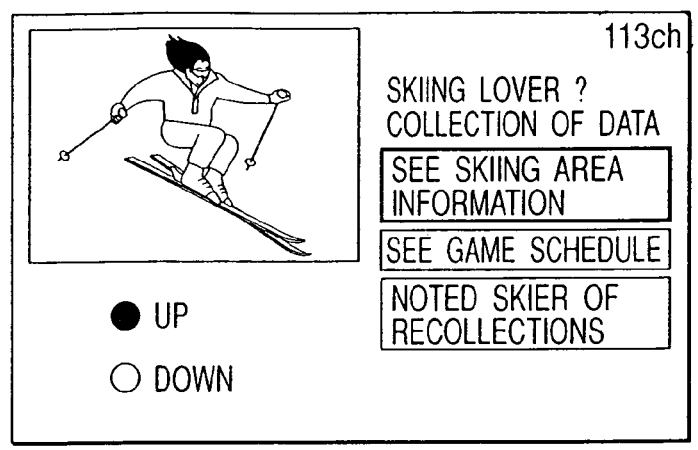
FIG. 10B
FIG. 10C 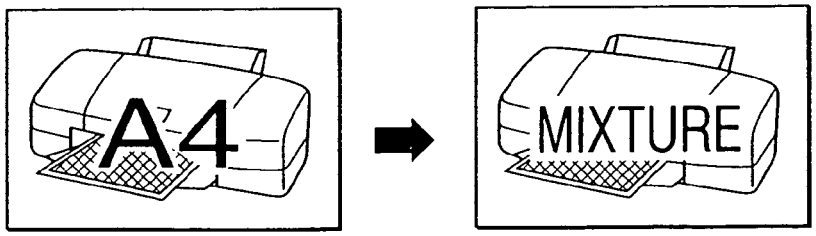 FIG. 10D
FIG. 10E

FIG. 11

|  | THE NUMBER OF BITS | VALUE |
|---|---|---|
| stream_type | 8 | 0x1D |
| reserved | 3 | 111(binary) |
| elementary_PID | 13 | 0x1F41 |
| reserved | 4 | 1111(binary) |
| ES_info_length | 12 | 0x003 |
|   stream_identifier_descriptor(){ | | |
|     descriptor_tag | 8 | 0x52 |
|     descriptor_length | 8 | 0x01 |
|     component_tag | 8 | 0x50 |
|   } | | |
|   data_component_descriptor(){ | | |
|     descriptor_tag | 8 | 0xFD |
|     descriptor_length | 8 | 0x05 |
|     data_component_id | 16 | 0x000F |
|   print_time_info(){ | | |
|     start_time | 40 | 0xC9BF120000 |
|     duration | 24 | 0x010000 |
|   } | | |
| } | | |

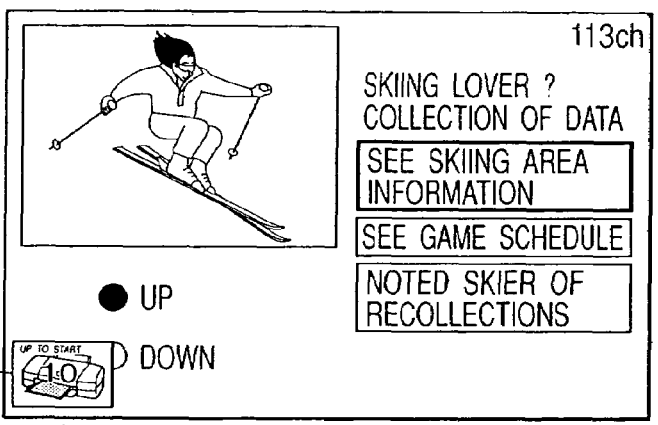
FIG. 12B
ENLARGEMENT
FIG. 12C 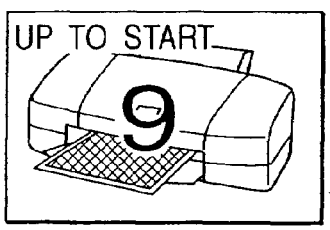 → FIG. 12D 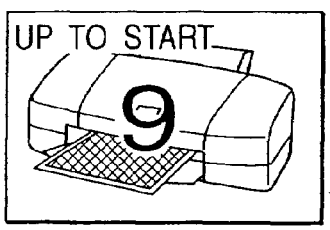
FIG. 12E ↓
FIG. 12F ← 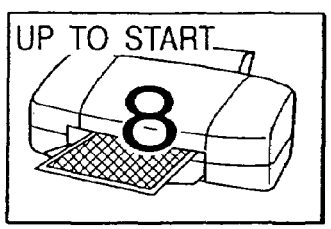 ← 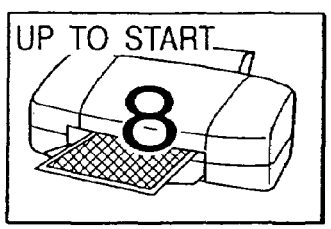

DATA RECEIVING APPARATUS, METHOD AND STORAGE MEDIUM THEREFOR

BACKGROUND OF THE INVENTION

1. Field of the Invention

The present invention relates to a data receiving apparatus, a method and a storage medium therefor, and more particularly to a data receiving apparatus, a method and a storage medium therefor adapted for use for data processing in television broadcasting receiver adaptable to data broadcasting reception, capable of receiving, displaying and reproducing data broadcasting contents in which for example characters, images, sound etc. are multiplexed.

2. Description of the Related Art

The data broadcasting has conventionally been operated in the ground wave television broadcasting, and is being broadened to the satellite-based digital broadcasting. In any of these data broadcastings, the data are broadcasted by superposing with a broadcast wave. In the receiving terminal, the broadcast wave is received and the accumulated data are read into a personal computer or an exclusive terminal and are displayed by a general WWW (world wide web) browser software or an exclusive browser software.

It is now anticipated to provide a new service by rendering the aforementioned data broadcasting service receivable not only by the personal computer but also by the television receiver. More specifically, by providing the television receiver with the receiving function for the data broadcasting and the browser software, even the user without the personal computer can easily browse various information and there can be provided a service for displaying information, linked with the television program, by characters or by images.

As an example, there is being proposed a new news service utilizing the data broadcasting. In this service, news images etc. are recorded in advance in the storage device of the television receiver and a data broadcasting image consisting of characters or images is provided as "news items" to the user, and the image of a news item selected by the user for example through the remote controller is reproduced. Such system allows to provide a conventionally unavailable new service enabling the user to view, at any time, the news program that has been observable only at predetermined times or enabling the user to only view the news item desired by the user.

However, in case of providing the television receiver with the receiving function for the aforementioned data broadcasting, a somewhat larger font is usually used in order to improve the visibility of the characters. As a result, the amount of character information that can be displayed at a time is naturally reduced, and, it is only possible to three to five news contents for example in the aforementioned news service and it is difficult to display many news items together with abstract and photographs.

Although it is conceivable to display the information that cannot be displayed within a single screen by scrolling or by page switching, but such method imposes the user to execute additional operation and cannot be considered adequate for the user who is not used to the operation environment of personal computer or television games.

Also the convenience to the user can be increased by printing the useful content of the broadcast program or the data broadcasting on paper through a printer, thereby enabling the user to watch such content afterwards. In such case, it is conceivable to connect the television receiver with a video printer for capturing and printing the image displayed on the television receiver, but, since a large font is generally employed in order to improve the visibility of the characters as explained in the foregoing, the printed characters inevitably become large and there can be exploited the advantage of paper which generally provide higher visibility of characters in comparison with the television screen.

In consideration of the foregoing, it is now conceived to broadcast, together with the program broadcasting or the display data in the data broadcasting, print data such as more detailed image data or character data related with such broadcasting in superposition, and to execute printing with such superposed data, but such system is associated with the following drawbacks.

Firstly, the user is unable to easily recognize when the print data are transmitted during the program viewing, so that the user is required to execute cumbersome operations in the course of the program viewing in order to confirm the presence of the print data. Also in case the print data are transmitted in the course of program viewing, the user may be unable to recognize the kind of the transmitted print data, so that the optimum preparation for printing may not be possible. Also the user may be unable to recognize the volume of the data to be printed, so that the optimum preparation for printing may not be possible.

SUMMARY OF THE INVENTION

In consideration of the foregoing, the object of the present invention is to solve the aforementioned drawbacks, namely to prevent a situation where the printing is not possible even though the print data are transmitted in the course of program viewing and to allow the user to properly prepare the kind and number of print sheets for the printer in advance.

The above-mentioned object can be attained, according to the present invention, by a television broadcasting data receiving apparatus, comprising:

a receiving unit adapted to receive television broadcasting data which includes an image data of a broadcasting program, a printing data related to the broadcasting program, and print additional information for notifying a user of an attribute of the printing data;

a print controlling unit adapted to output the printing data included in the television broadcast data received by the received unit to a printing apparatus;

an acquiring unit adapted to extract the print attribute information from the television broadcasting data received by the receiving unit; and a display control unit adapted to generate display data on the basis of the print additional information acquired by the acquiring unit and output, to a display device, the display data together with the image data included in the television broadcasting data received by the receiving unit, wherein the print additional information included in the television broadcasting data includes at least one of information indicating a print sheet size of the printing data, information indicating the number of the print sheets of the printing data, and information indicating the type of the printing data.

Other objects of the present invention, and the features thereof, will become fully apparent from the following detailed description of embodiments, to be taken in conjunction with the accompanying drawings.

BRIEF DESCRIPTION OF THE DRAWINGS

FIGS. 2 and 3 are views showing examples of PMT inserted in TS data employed as trial for verifying and explaining the first embodiment of the present invention;

FIG. 7 is a block diagram showing the entire configuration of a digital television receiving apparatus in a second embodiment of the present invention;

FIG. 8 is a view showing an example of PMT inserted in TS data employed as trial for verifying and explaining the second embodiment of the present invention;

FIG. 9 is a view showing a print_content_info field in the second embodiment of the present invention;

FIGS. 10A, 10B, 10C, 10D, 10E and 10F are views showing an example of screen transition in the digital television receiving apparatus of the second embodiment of the present invention;

FIG. 11 is a view showing an example of PMT inserted in TS data employed as trial for verifying and explaining a third embodiment of the present invention;

FIGS. 12A, 12B, 12C, 12D, 12E and 12F are views showing a first example of screen transition in the digital television receiving apparatus of the third embodiment of the present invention;

DETAILED DESCRIPTION OF THE PREFERRED EMBODIMENTS

First Embodiment

Figure 1:
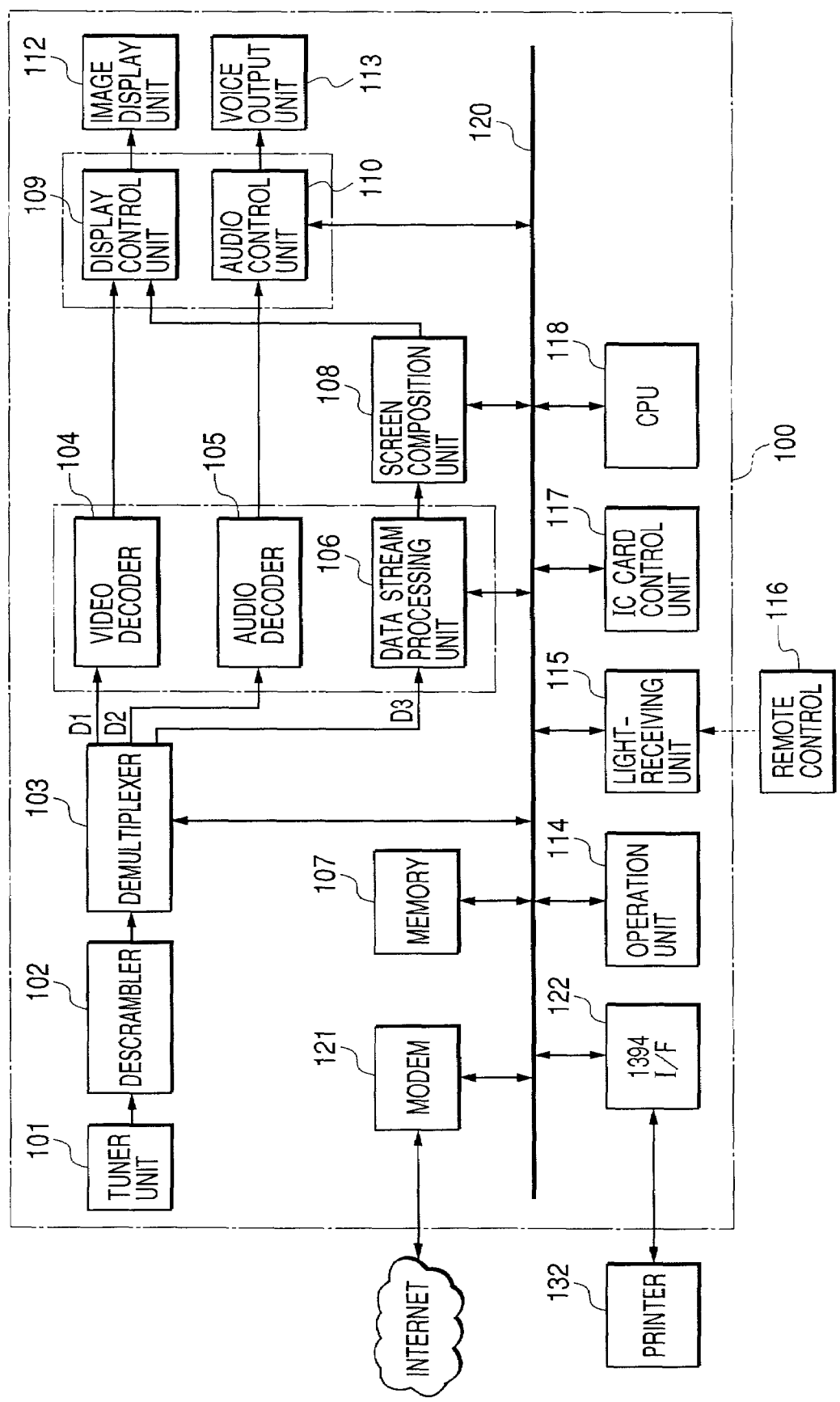
FIG. 1 is a block diagram showing the entire configuration of a digital television receiving apparatus in first, third, fourth or fifth embodiment of the present invention.

FIG. 1 is a block diagram showing the entire configuration of a digital television receiving apparatus in a first embodiment of the present invention. The digital television receiving apparatus of the first embodiment is provided with a tuner unit 101, a descrambler 102, a demultiplexer 103, a video decoder 104, an audio decoder 105, a data stream processing unit 106, a memory 107, a screen composition unit 108, a display control unit 109, an audio control unit 110, an image display unit 112, an audio output unit 113, an operation unit 114, a light receiving unit 115, an IC card control unit 117, a CPU 118, a bus 120, a modem 121 and an IEEE 1394 interface 122. There are also shown a remote controller 116 and a printer 132.

In the digital television receiving apparatus 100 of the above-described configuration, a signal received from an unrepresented antenna is supplied to the tuner unit 101 (unrepresented antenna and tuner unit 101 constituting reception means in claims 1, 33 and 49). The tuner unit 101 applies demodulation, error correction etc. to the entered signal to generate digital data of a format called transport stream. Thus generated transport stream (TS) data are supplied to the descrambler 102.

Upon receiving the TS data subjected to scrambling for viewing limitation from the tuner unit 101, the descrambler 102 executes descrambling based on key information for descrambling generated in the IC card control unit 117. The IC card control unit 117 is provided with an IC card storing contract information of the user and key information for decoding the descrambling key information contained in the TS data. Also in case of receiving the unscrambled TS data from the tuner unit 101, the descrambler 102 transfers such TS data without change to the demultiplexer 103.

The demultiplexer 103 identifies and extracts, from the TS data which are entered from the descrambler 102 and in which image data, audio data, electronic program data (EPG), data broadcasting data, print content data etc. of plural channels are multiplexed on time-sharing basis, each of the image data, audio data, EPG data/data broadcasting data/print contents data. The TS data are transmitted in the unit of a packet, including a PID (packet identifier) at the head thereof.

By reading the PID, the demultiplexer 103 identifies and extracts the TS packet containing the necessary image data D1, audio data D2, EPG data/data broadcasting/print contents data D3 from the TS data. Also the demultiplexer 103 extracts PAT (program association table) contained in the TS data and transmits the obtained PAT to the CPU 118 through the bus 120.

The CPU 118 analyzes the PAT thereby recognizing the PID of PMT (program map table) relating to the desired channel. Thereafter the CPU 118 requests the demultiplexer 103 to acquire a desired PMT. In response to the request, the multiplexer 103 extracts the desired PMT contained in the TS data and transmits the acquired PMT contained in the TS data to the CPU 118 through the bus 120. By analyzing the PMT, the CPU 118 obtains the PID of the TS packet containing the image, audio, data broadcasting data/print contents data of the desired channel and the additional information relating to the image, audio, data broadcasting data/print contents data.

FIGS. 2 and 3 are views showing an example of the PMT inserted in the TS data employed as trial for verification and description on the first embodiment of the present invention.

In FIG. 2, a portion (I) indicates a header portion of the PMT section, as in the description in ISO/IEC 13818-1, and contains information for recognizing the data length of PMT and the channel number, though the details will not be explained.

In FIG. 2, a portion (II) is similar to the description in ISO/IEC 13818-1, and contains information such as the PID of the TS packet containing PCR (program clock reference) value, though the details will not be explained.

In FIG. 2, a portion (III) is similar to the description in ISO/IEC 13818-1 and in the technical reference "BS digital broadcasting operation rule" of the ARIB, and describes image ES (elementary stream) constituting the program of the corresponding channel. A portion 'stream_type=0x02' indicates an image stream defined by the ISO/IEC 13818-2. The PID of the TS packet containing the aforementioned image ES is described in the portion 'elementary_PID'. Also a portion 'component_tag=0x00' in 'stream_identifier_descriptor' indicates that the image ES is a default ES in the currently received channel.

In FIG. 2, a portion (IV) is similar to the description in ISO/IEC 13818-1 and in the technical reference "BS digital broadcasting operation rule" of the ARIB, and describes audio ES (elementary stream) constituting the program of the corresponding channel. A portion 'stream_type=0x0F' indicates an audio stream defined by the ISO/IEC 13818-7. The PID of the TS packet containing the aforementioned audio ES is described in the portion 'elementary_PID'. Also a portion 'component_tag=0x10' in 'stream_identifier_descriptor' indicates that the audio ES is a default ES in the currently received channel.

A portion (V) in FIG. 3 is similar to the description in ISO/IEC 13818-1 and in the technical reference "BS digital broadcasting operation rule" of the ARIB, and describes the data broadcasting contents contained in the corresponding channel. A portion 'stream_type=0x0D' indicates a data carousel defined by the ISO/IEC 13818-6. The PID of the TS packet containing the aforementioned data broadcasting contents is described in the portion 'elementary_PID'. Also a portion 'component_tag=0x40' in 'stream_identifier_descriptor' indicates that the data broadcasting contents are default contents in the currently received channel. The portion 'data_component_descriptor' is described in the standards "program arrangement information to be used in the ARIB STD-B10 BS digital broadcasting", "data broadcasting encoding method and transmission method in the ARIB STD-B24 digital broadcasting" etc. of ARIB and is used for identifying the data encoding method. This descriptor 'data_component_id' is used for identifying the data encoding method, and the descriptor 'data_component_id=0x0007' indicates the ARIB-XML base multimedia encoding method. A portion (V) in FIG. 3 will be explained later.

According to the information described in the aforementioned PMT, the demultiplexer 103 extracts the image data D1 and the audio data D2 of the currently broadcasted program, and sends them respectively to the video decoder 104 and the audio decoder 105. Similarly the demultiplexer 103 extracts the EPG data/data broadcasting data/print contents data D3 from the aforementioned TS data and sends them to the data stream processing unit 106.

At first there will be given an explanation on the image data D1. The video decoder 104 applies the MPEG decoding process on the image data D1 entered from the demultiplexer 103, and outputs the decoded image data to the display control unit 109. The display control unit 109 executes display on the image display unit 112 by switching or multiplexing the image screen according to the operation of the operation unit 114 or the remote controller 116. The screen composition unit 108 will be explained later. The image display unit 112 also includes an unrepresented monitor and an image signal input terminal.

In the following there will be given an explanation on the audio data D2. The audio decoder 105 applies the MPEG decoding process on the audio data D2 entered from the demultiplexer 103, and outputs the decoded audio data to the audio control unit 110. The audio control unit 110 executes D/A conversion on the audio data entered from the audio decoder 105. The audio output unit 113 includes an unrepresented speaker and an audio signal input terminal.

In the following there will be given an explanation on the data broadcasting/EPG data D3. The electronic program guide (EPG) data are transmitted with a data structure defined by the ARIB standard "program arrangement information to be used in the digital broadcasting" etc. The principal constituting data include TDT (time description table) or TOT (time offset table) for transmitting the current time information, SDT (service description table) for transmitting the information on the channel configuration such as the name of the channel and the name of the broadcasting firm, and EIT (event information table) for transmitting the information on the program such as name of the program, date and time for starting the broadcasting, explanation of the program content etc.

The data broadcasting data are transmitted repeatedly from the broadcasting station by the DSM-CC data carousel system defined and described in the ISO/IEC 13818-6 and the ARIB technical reference "BS digital broadcasting operation rule". The data broadcasting data acquired by the demultiplexer 103 include text information, script information, image information and image/audio data, and are described by the XML (extensible Markup Language) defined by W3C.

The data broadcasting/EPG data D3 are decoded by the data stream processing unit 106 and are entered into the memory 107 through the bus 120.

The CPU 118, upon receiving an instruction for data broadcast display from the operation unit 114 or from the remote controller 116 through the light receiving unit 115, reads the EPG data and the XML data from the memory 107 and outputs them to the screen composition unit 108.

The screen composition unit 108 supplies the display control unit 109 with an image signal based on the EPG data and XML data processed and outputted by the CPU 118. The display control unit 109 outputs the image signal to the image display unit 112 in order to execute switched and synthesized display of the image screen, EPG display screen and data broadcasting screen etc.

The bus 120 is further connected to an IEEE 1394 interface (I/F) 122 and a modem 122. The IEEE 1394 I/F 122 is used for executing protocol communication and data transmission/reception with the printer 132 connected to the present digital television receiving apparatus. Also the modem 121 is used for internet connection through an unrepresented telephone line.

Figure 4:
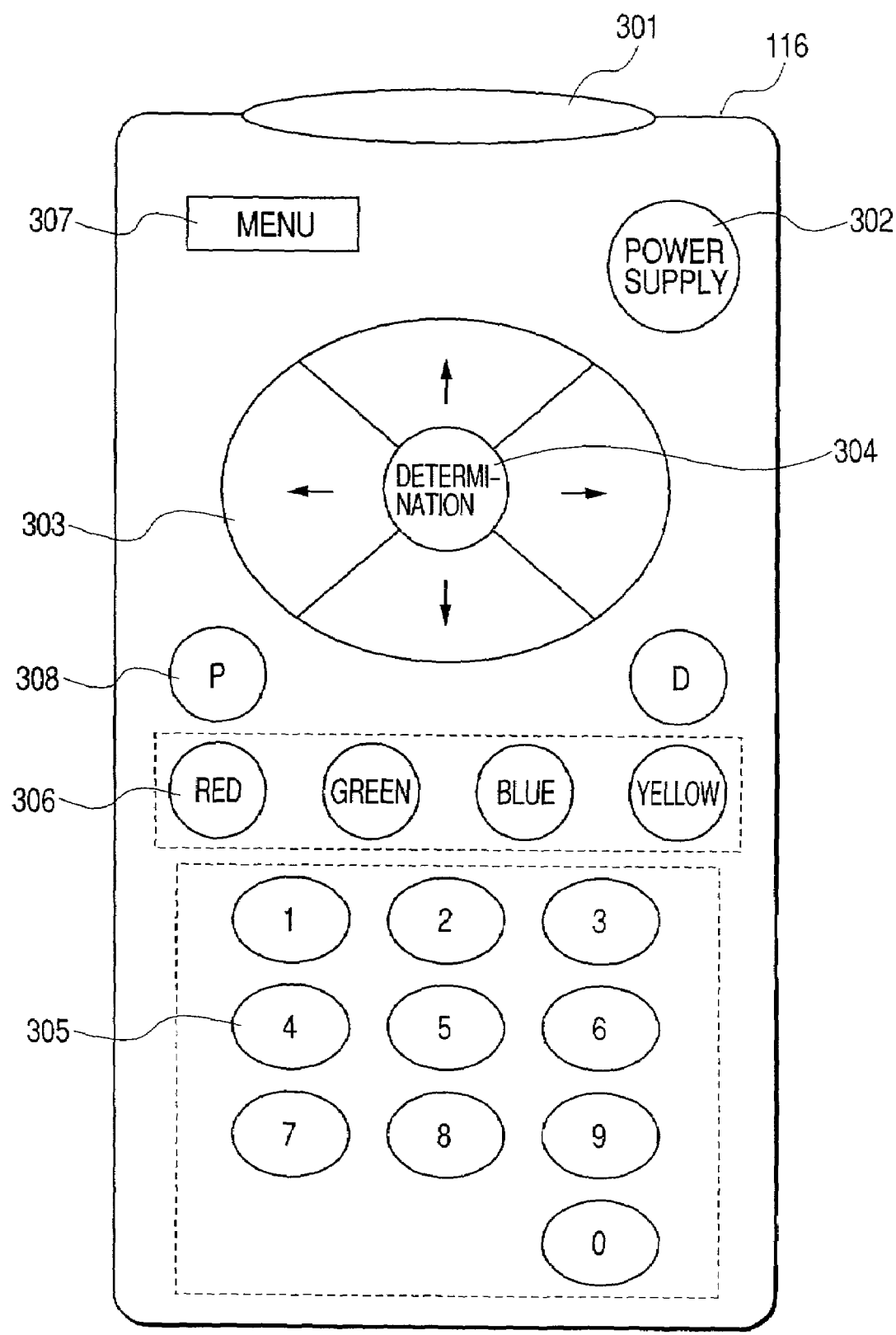
FIG. 4 is a schematic view showing an example of a remote controller in the first embodiment of the present invention.

FIG. 4 is an elevation view showing the configuration of the remote controller 116, which is provided with a light emitting unit 301, a power supply key 302, cursor keys 303, a determination key 304, ten keys 305, color keys 306, a menu button 307 and a P-button 308. However, FIG. 4 principally shows the buttons for realizing the functions required for the first embodiment, and does not necessarily cover the buttons required for operating the actual digital television receiving apparatus. Also in addition to the components shown in FIG. 4, there may be employed a pointing device such as a mouse.

In the above-described configuration, the light emitting unit 301 is used for infrared communication between the remote controller 116 and the light receiving unit 115 of the digital television receiving apparatus 100. The power supply key 302 is used for turning on/off the power supply of the digital television receiving apparatus 100. The cursor keys 303 are used for vertically and laterally moving a selecting cursor. The determination button 304 is used for determining a selection area designated by the selecting cursor.

The menu button 307 is used for displaying a data broadcasting image on the image display unit 112 of the digital television receiving apparatus 100. The color keys 306 are arranged, for example, in the order of "red", "green", "blue" and "yellow" from left to right. The ten keys 305 are used for entering channel number of numerical values in the digital television receiving apparatus 100.

The CPU 118 has a program executing function and, according to the operation of the operation unit 114 provided with various operation switches channel selecting or power supply on/off, or the remote controller 116, controls the tuner unit 101, descrambler 102, demultiplexer 103, video decoder 104, audio decoder 105, data stream processing unit 106, screen composition unit 108, display control unit 109 and audio control unit 110.

In the following there will be explained the print contents data. In the following description, the transmission of the print contents data is executed utilizing and expanding PSI (program specific information), tables such as DSM-CC, descriptors and parameters thereof defined and described in the ISO/IEC 13818 and in the standards and technical references of the ARIB, but such system is merely employed on trial basis for verifying and explaining the first embodiment of the present invention and the transmission of the print contents data is not limited to such system. The print contents data include text information, script information and image information, and is described by XML (extensible Markup Language) defined by W3C.

The demultiplexer 103 acquires the PMT (program map table) contained in the TS data and relating to the currently viewed channel. The acquired PMT is fetched in the CPU 118 through the bus 120 as explained in the foregoing. The CPU 118 analyzes the section syntax of the fetched PMT, thereby discriminating whether the print contents data are transmitted in association with the currently viewed program. The CPU 118 executes such discrimination by identifying whether the PMT as shown in FIG. 3 includes description on the print contents data. In the following there will be given on the description shown in FIG. 3.

A portion (VI) in FIG. 3 describes the print contents data on the corresponding channel. A portion 'stream_type=0x1D' indicates that the data transmitted by the TS packet having the PID value indicated by 'elementary_PID' to be explained later are contents data for printing (print contents data). Also a portion 'elementary_PID=0x1F41' indicates that the PID of the TS packet, containing the print contents data transmitted by the data carousel method or the control information, is '0x1F41'. Also a portion 'ES_info_length=0x003' indicates that the number of bytes of the ensuing descriptor information on the print contents data is 3 bytes. A portion 'component_tag=0x50' described in 'stream_identifier_descriptor' indicates that the print contents are default contents in the currently received channel.

The CPU 118 analyzes the PMT described as explained in the foregoing, and, if it contains 'stream_type=0x1D', identifies the presence of the print contents data associated with the currently viewed program and executes display, on the display screen, for informing the presence of the print contents data. Also in analyzing the PMT described as explained in the foregoing, and if it does not contain 'stream_type=0x1D', the CPU 118 does not execute display for informing the presence of the print contents data.

In this operation, the CPU 118 constructs, in the screen composition unit 108, OSD (on screen display) data for indicating the presence of the print contents data as shown in FIGS. 5 and 6, and controls the various units so as to synthesize and output the OSD data and the image data of the program to the display control unit 109. The OSD display will be explained later.

Also the CPU 118 extracts a TS packet of which the PID is '0x1F41' from the TS data and controls the demultiplexer 103 for its output to the data stream processing unit 106. The data stream processing unit 106 executes decoding process on the entered print contents data for supply to the memory 107. The memory 107 stores the repeatedly transmitted print contents data with constant renewal.

FIGS. 5A, 5B, 5C and 5D show an example of transition of the images displayed on the image display unit 112 in the course of program viewing.

Figure 5B:
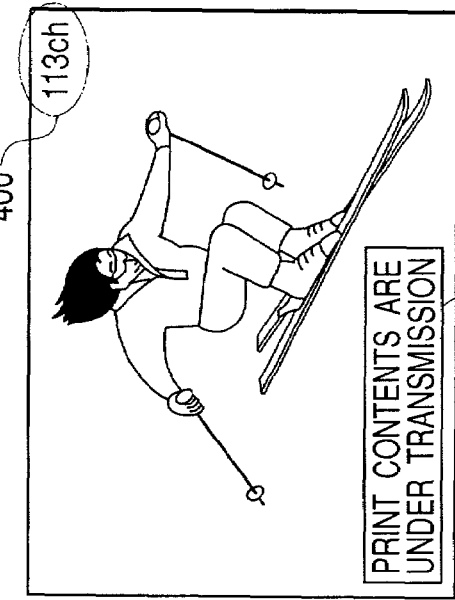
FIGS. 5A, 5B, 5C and 5D are views showing a first example of screen transition in the digital television receiving apparatus of the first embodiment of the present invention.
Figure 5D:
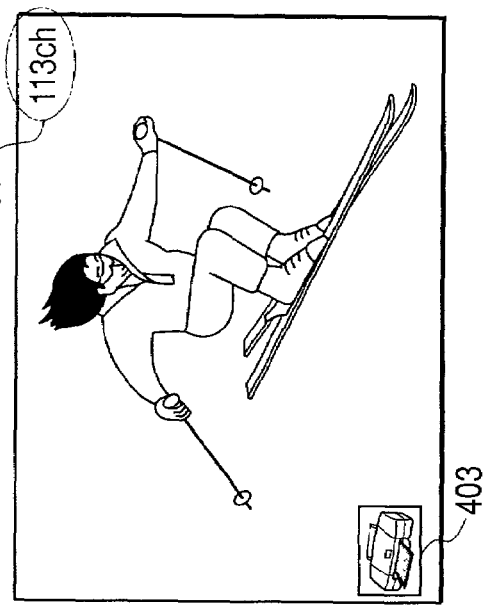
Figure 5A:
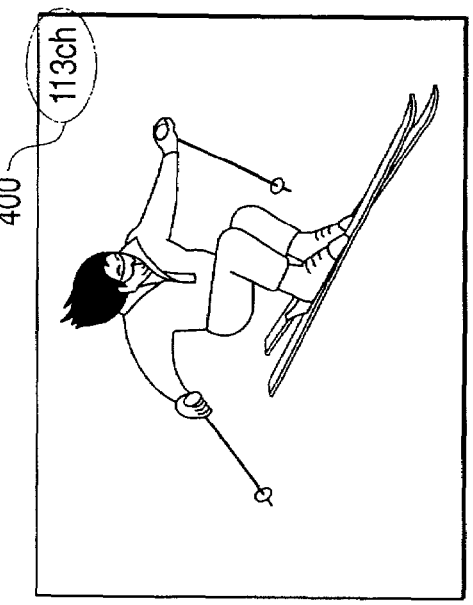
Figure 5C:
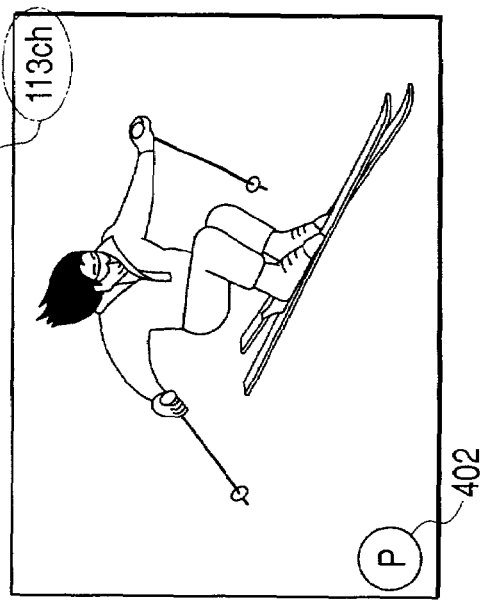

FIG. 5A shows the display of the currently viewed image program, wherein a channel number display 400 indicates that a channel 113 is currently viewed. The CPU 118 sends the channel number display data through the bus 120 to the screen composition unit 108, which constructs the OSD (on screen display) data, and the display control unit 109 synthesizes the program image data from the video decoder 104 and the OSD data for display in the image display unit 112.

FIG. 5B shows an example of the image display on the image display unit 112 in case the presence of the print contents data is identified in association with the currently viewed program, wherein an OSD display message 401 indicates the presence of the print contents data relating to the currently viewed channel 113. Such OSD display may also be achieved by a mark 402 shown in FIG. 5C or by an icon 403 shown in FIG. 5D.

FIGS. 6A, 6B, 6C and 6D show an example of transition of the images displayed on the image display unit 112 in the course of viewing or a data broadcasting program.

Figure 6A:
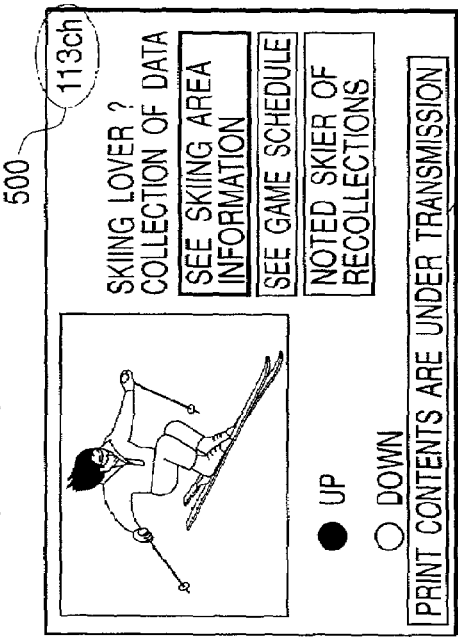
FIGS. 6A, 6B, 6C and 6D are views showing a second example of screen transition in the digital television receiving apparatus of the first embodiment of the present invention.

FIG. 6A shows the display of the currently viewed data broadcasting program, wherein a channel number display 500 indicates that a channel 113 is currently viewed. The method of display is similar to that explained above.

Figure 6B:
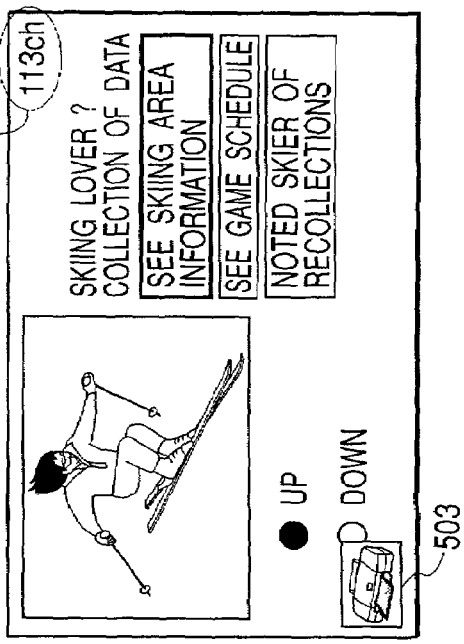
Figure 6C:
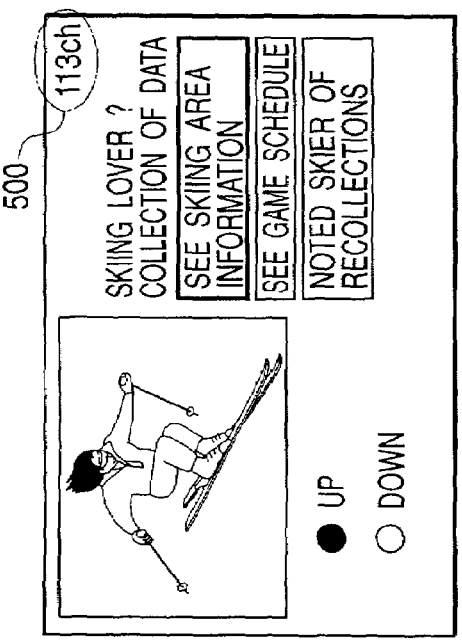
Figure 6D:
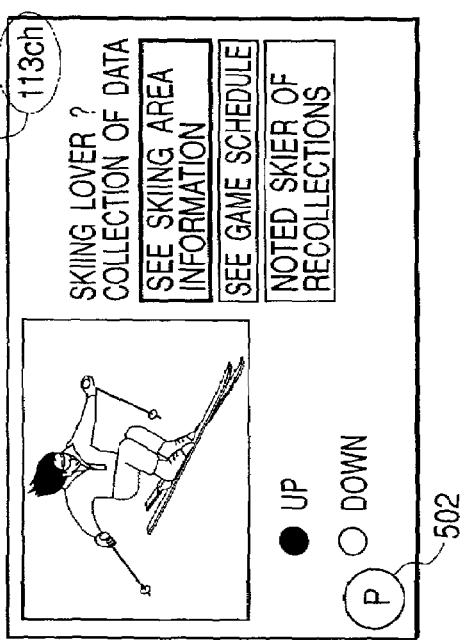

FIG. 6B shows an example of the image display on the image display unit 112 in case the presence of the print contents data is identified in the currently received TS data, wherein an OSD display message 501 indicates the presence of the print contents data in the currently viewed data broadcasting of the channel 113. Such OSD display may also be achieved by a mark 502 shown in FIG. 6C or by an icon 503 shown in FIG. 6D.

In case the message 401, 501, the mark 402, 502 or the icon 403, 503 as shown in FIGS. 5A, 5B, 5C, 5D, 6B, 6C or 6D is displayed on the image of the image display unit 112 of the digital television receiving apparatus, the user can print the print contents data by depressing the P-button 308 provided in the remote controller 116 shown in FIG. 4. As explained in the foregoing, the print contents data are stored in the XML data format in the memory 107, and the print data generation process is executed in the CPU 118. More specifically, the CPU 118 converts the print contents data entered from the memory 107 into print data (for example bit map data) with the layout, font and colors designated in the XML data and outputs such print data to the printer 132 through the 1394 I/F 122.

As explained in the foregoing, the digital television receiving apparatus of the first embodiment of the present invention is capable of executing OSD display of the message 401, 501, mark 402, 502 or icon 403, 503 as shown in FIGS. 5A, 5B, 5C, 5D, 6B, 6C or 6D, through the image display unit 112 of the apparatus, on the image screen of the currently viewed program or data broadcasting, whereby the user can easily know the print contents data associated with the currently viewed program.

Also in case the print contents data are identified to be present in the currently received TS data in the display state shown in FIG. 5A or 6A, it is also possible that the CPU 118 generates and transmits audio message to the audio control unit 110 through the bus 120 whereby the audio output unit 113 outputs an audio message such as "print contents are being transmitted" to the user.

In case the audio message such as "print contents are being transmitted" is outputted from the audio output unit 113, the user can print the print contents data by depressing the P-button 308 provided in the remote controller shown in FIG. 4.

It is furthermore possible and more effective to combine the aforementioned message, mark or icon display with the audio display for informing the user of the presence of the print contents data associated with the currently viewed program and requesting the printing thereof.

Second Embodiment

FIG. 7 is a block diagram showing the entire configuration of a digital television receiving apparatus in a second embodiment of the present invention, which is provided, in addition of the configuration of the first embodiment, with an accumulation unit 123 for accumulating the print contents as will be explained later. In FIG. 7, components equivalent to those in FIG. 1 are represented by like numbers and will not be explained further.

FIG. 8 shows an example of the description on the print contents data associated with the channel, in a portion corresponding to that of the first embodiment shown in FIG. 3, in the PMT inserted on trial basis for verifying and explaining the second embodiment of the present invention.

The demultiplexer 103 acquires the PMT (program map table) contained in the TS data and relating to the currently viewed channel. The acquired PMT is fetched in the CPU 118 through the bus 120. The CPU 118 analyzes the section syntax of the fetched PMT, thereby discriminating whether the print contents data are multiplexed in the TS data. The CPU 118 executes such discrimination by identifying whether the PMT as shown in FIG. 8 includes description on the print contents data.

A portion 'stream_type=0x1D' in FIG. 8 indicates that the data transmitted by the TS packet having the PID value indicated by 'elementary_PID' are contents data for printing. Also a portion 'elementary_PID=0x1F41' indicates that the PID of the TS packet, containing the print contents data transmitted by the data carousel method or the control information, is '0x1F41'. Also a portion 'ES_info_length=0x00A' indicates that the number of bytes of the ensuing descriptor information on the print contents data is 10 bytes. A portion 'component_tag=0x50' described in 'stream_identifier_descriptor' indicates that the print contents are default contents in the currently received channel.

In the following there will be explained, with reference to FIGS. 8 and 9, a 'print_content_info' field describing the additional information on the print contents in 'data_component_descriptor.

A portion 'transmission_format' indicates the transmission method of the print contents, and a value "00" shown in FIG. 8 indicates that the data carousel method and the even message transmission method are employed as shown in FIG. 9.

A portion 'document_size' indicates the optimum sheet size in case of printing the print contents, and a value "0100" shown in FIG. 8 indicates that the A4-sized print sheet is optimum as shown in FIG. 9.

A portion 'document_type' indicates the type of the transmitted print contents (JPEG (joint photographic experts group) image, PNG (portable network graphics) image, text data etc.), and a value "0000" shown in FIG. 8 indicates that the print contents of plural kinds such as the JPEG image, PNG image, text data etc. are contained as shown in FIG. 9.

A portion 'document_volume' indicates the hexadecimal number of the print sheets in case of printing the transmitted print contents with the sheets of the size indicated by 'document_size', and a value "0x06" shown in FIG. 8 indicates that 6 sheets are required in total.

A portion 'content_storable_flag' indicates whether the transmitted print contents are storable for example in the accumulation unit 123, and a value "01" shown in FIG. 8 indicates that the contents are storable as shown in FIG. 9.

The CPU 118 analyzes the PMT described as explained in the foregoing, and, if it contains 'stream_type=0x1D', identifies the presence of the print contents data associated with the currently viewed program. When the presence of the print contents data is identified, an OSD display as shown in FIGS. 10A, 10B, 10C, 10D, 10E and 10F are multiplexed in the image screen of the currently viewed program or data broadcasting. The multiplexed OSD display data are generated by the screen composition unit 108 based on the PMT data analyzed by the CPU 118, and are outputted to the image display unit 112 through the display control unit 109. FIGS. 10A, 10B, 10C, 10D, 10E and 10F show an example of the images for displaying information on the print contents data.

Figure 10F:
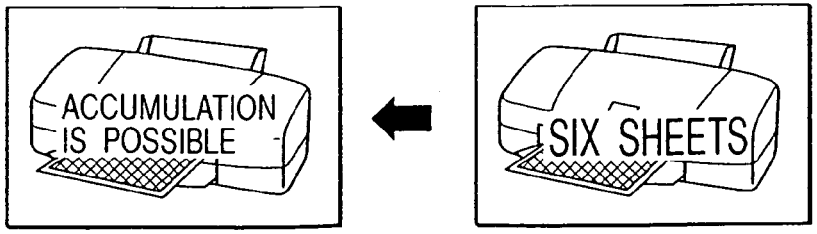

FIG. 10A shows the display of the currently viewed data broadcasting program, and, when the presence of the print contents data is recognized, the screen is shifted as shown in FIG. 10B, wherein an OSD displayed icon 901 indicates the presence of print contents data relating to the channel 113 currently viewed. The OSD displayed icon 901 changes in succession at every predetermined time as shown in FIGS. 10C, 10D, 10E and 10F. The content of the display may be changed according to a switching instruction by the user, in addition to the automatic changing. Also these plural contents may be displayed at a time.

FIG. 10C shows a magnified display of the icon 901 informing the user of the current presence of the print contents data, and informs that the optimum sheet size in case of printing the print contents data is A4 size. This display is determined by the aforementioned 'document_size', and, for example "A3" is displayed in the icon in case 'document_size="0011"'.

FIG. 10D shows a magnified display of the icon 901 informing the user of the current presence of the print contents data, and informs that the kind of the print contents data is mixed, including the JPEG image, PNG image, text data etc. This display is determined by 'document_type', and, for example "JPEG" is displayed in the icon in case 'document_type="0001"'.

FIG. 10E shows a magnified display of the icon 901 informing the user of the current presence of the print contents data, and indicates that six sheets are required in case of printing the print contents data. This display is determined by the aforementioned 'document_volume', and, for example "10" is displayed in the icon in case 'document_volume'="0x0A'".

FIG. 10F shows a magnified display of the icon 901 informing the user of the current presence of the print contents data, and indicates that the content of the print contents data is storable. This display is determined by the aforementioned 'content_storable_flag' and, for example "not storage" is displayed in the icon in case 'content_storable_flag'="00"'.

In case the icon as shown in FIGS. 10C, 10D or 10E is displayed on the screen, the user can print the print contents data by depressing the P-button 308 provided in the remote controller 116. As explained in the foregoing, the print contents data are stored in the XML data format in the memory 107, and the print data generation process is executed in the CPU 118. More specifically, the CPU 118 converts the print contents data entered from the memory 107 into print data (for example bit map data) with the layout, font and colors designated in the XML data and outputs such print data to the printer 132.

Also in case the icon as shown in FIG. 10F is displayed on the screen, the user can store the print contents data in the accumulation unit 123 by depressing the P-button 308 provided in the remote controller 116. As explained in the foregoing, the print contents data are stored in the XML data format in the memory 107, and the print data generation process is executed in the CPU 118. More specifically, the CPU 118 converts the print contents data entered from the memory 107 into print data (for example bit map data) with the layout, font and colors designated in the XML data and outputs the data to the accumulation unit 123 through the bus 120. However the print data may be stored in the accumulation unit 123 in a state described in the XML format.

As explained in the foregoing, the digital television receiving apparatus of the second embodiment is capable of executing OSD displays in succession of the icons shown in FIGS. 10C, 10D, 10E and 10F in a portion 901 shown in FIG. 10B, whereby the user can easily know the presence of the print contents data associated with the currently viewed program and that such contents require 6 sheets in A4 size, include JPEG image, PNG image, text data etc. and are storable. Knowing these information, the user can correctly prepare in advance the type and number of sheets in the printer 132 at the printing thereon.

Also since the desired print contents data are rendered storable, the user need not hastily judge whether or not to execute the printout process while viewing the program but can execute the printout process leisurely after the program viewing is terminated. Also in the present embodiment, the information such as the sheet size optimum for printout is multiplexed in the OSD display indicating the presence of the print content data, but the information relating to the print contents data is not limited to such case and it is also possible for example to multiplex the content information of the print contents data (for example cooking recipe or a news) or to change the form of the OSD display according to the content information of the data.

Also in case a high definition image is transmitted as the print contents, such fact may be transmitted to the user.

Also in case the print contents data are identified to be present in the currently received TS lo data in the display state shown in FIG. 10A, it is also possible that the CPU 118 generates and transmits an audio message to the audio control unit 110 through the bus 120 whereby the audio output unit 113 outputs an audio message such as "prepare A4 size sheets" to the user.

In case the audio message such as "print contents are being transmitted" or "prepare A4 size sheets" is outputted from the audio output unit 113, the user can print the print contents data by depressing the P-button 308 provided in the remote controller shown in FIG. 4.

It is furthermore possible and more effective to combine the aforementioned message, mark or icon display with the audio display for informing the user of the presence of the print contents data associated with the currently viewed program or the optimum sheet size for printout and requesting the printing of such print contents data.

Third Embodiment

The configuration and operation of the digital television receiving apparatus of a third embodiment of the present invention are similar to those of the first embodiment, and will not therefore be explained further. The present embodiment is different from the foregoing first embodiment in executing a countdown display of the time to the start of transmission of the print contents data, and/or of the time to the end of transmission thereof.

FIG. 11 shows an example of the description on the print contents data associated with the channel, in a portion corresponding to that of the first embodiment shown in FIG. 3, in the PMT inserted on trial basis for verifying and explaining the third embodiment of the present invention.

The demultiplexer 103 acquires the PMT (program map table) contained in the TS data and relating to the currently viewed channel. The acquired PMT is fetched in the CPU 118 through the bus 120. The CPU 118 analyzes the section syntax of the fetched PMT, thereby discriminating whether the print contents data are associated with the currently viewed program. The CPU 118 executes such discrimination by identifying whether the PMT as shown in FIG. 11 includes description on the print contents data.

A portion 'stream_type=0x1D' in FIG. 11 indicates that the data transmitted by the TS packet having the PID value indicated by 'elementary_PID' are contents data for printing. Also a portion 'elementary_PID=0x1F41' indicates that the PID of the TS packet, containing the print contents data transmitted by the data carousel method or the control information, is '0x1F41'. Also a portion 'ES_info_length=0x012' indicates that the number of bytes of the ensuing descriptor information on the print contents data is 18 bytes. A portion 'component_tag=0x50' described in 'stream_identifier_descriptor' indicates that the print contents are default contents in the currently received channel.

In the following there will be explained a 'print_time_info' field describing the transmission time information on the print contents data in 'data_component_descriptor.

A portion 'start_time' indicates the transmission start time of the print contents, and includes the Japanese standard time (JST), the current time by the modified Julius date (MJD) and the current time. In this field, the lower 16 bits of MJD are encoded by 16 bits, and the ensuing 24 bits are encoded by six binarized 4-bit decimal numbers (BCD). In FIG. 11, a value "0xC9BF120000" indicates that the transmission start time of the print contents data is at "year 2000, April, 13th day, 12 hours, 00 minutes and 00 seconds". This encoding method is similar to the JST_time described in the TDT (time description table) or TOT (time offset table) defined in the ARIB standard "program arrangement information to be used in the digital broadcasting".

A portion 'duration' indicates the transmitting duration of the print contents data, in which 24 bits are encoded by six binarized 4-bit decimal numbers (BCD). A value "0x010000" shown in FIG. 11 indicates that the transmitting duration of the print contents data is "1 hour, 0 minutes and 0 seconds".

The transmission start time of the print contents data indicates the first data transmission start time in the repeatedly transmitted print contents data, and the transmitting duration is the data transmitting time in total of the repeatedly transmitted print contents data from the initial transmission to the final transmission.

The CPU 118 analyzes the PMT described as explained in the foregoing, and, if it contains 'stream_type=0x1D', identifies the presence of the print contents data in the currently received TS data. When the presence of the print contents data is identified, an OSD display as shown in FIGS. 12A, 12B, 12C, 12D, 12E and 12F is multiplexed in the image screen of the currently viewed program or data broadcasting. The multiplexed OSD display data are generated by the screen composition unit 108 based on the time information to the transmission start time calculated by the CPU 118 as will be explained later, and are outputted to the image display unit 112 through the display control unit 109.

FIGS. 12A, 12B, 12C, 12D, 12E and 12F show an example of the displays for the time information to the transmission start time of the print contents data.

Figure 12A:
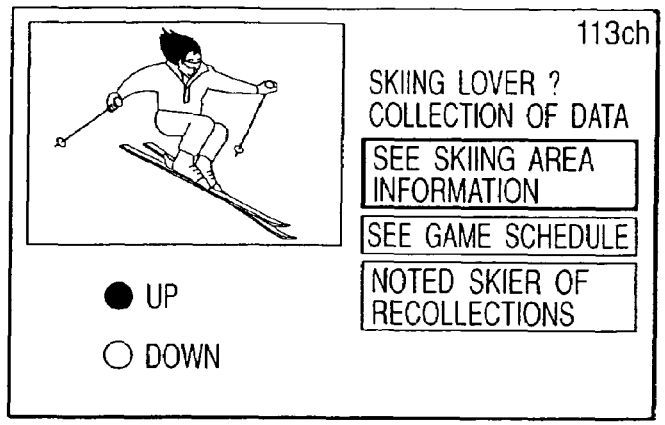

FIG. 12A shows the display of the currently viewed data broadcasting program, and, when the presence of the print contents data is recognized, the screen is shifted as shown in FIG. 12B, wherein an OSD displayed icon 1101 indicates the presence of print contents data relating to the channel 113 currently viewed and the time information to the transmission start time of the print contents data. FIG. 12C shows a magnified display of the OCD display 1101 informing that the transmission of the print contents data is started from "after 10 seconds".

The CPU 118 calculates the time difference between the current time information indicated by TDT or TOT and the information described in 'start_time' in the 'print_time_info' field in the PMT shown in FIG. 11, thereby determining the numbers to be displayed in the icon shown in FIG. 12C. For example, in case the current time described in the TDT or TOT is "0xC9BF115950" (=year 2000, April, 13th, 11 hours, 59 minutes, 50 seconds) while the 'start_time' in FIG. 11 is "0xC9BF120000 (=year 2000, April, 13th, 12 hours, 00 minutes, 00 seconds), the time difference is 10 seconds so that a display as shown in FIG. 12C is given.

Thereafter the time is counted by timer means (not shown) provided in the CPU 118, and the display is renewed in succession as shown in FIG. 12D at "after 9 seconds", in FIG. 12E at "after 8 seconds and in FIG. 12F at "after 7 seconds" until "after 0 seconds" when the transmission of the print contents data is started.

The above-described icon display allows the user to recognize in advance the start time of transmission of the print contents data, thereby enabling the user to execute preparation of the sheets etc. for the printer. In the present embodiment, the time counting is started at 10 seconds before the start of transmission, but such time count starting time can be arbitrarily selected, for example 20 seconds or 1 minute.

Also, as above-mentioned, the print contents data the transmission of which has been started is transmitted as shown in duration (sending time of the print contents data) in PMT in FIG. 11. That is, when the transmission of the contents data is completed after the time in the duration passed, an example of display of OSD multiplexed on screen of image program and data broadcasting program is shown in FIGS. 13A, 13B, 13C, 13D and 13E.

Figure 13A:
FIGS. 13A, 13B, 13C, 13D, 13E and 13F are views showing a second example of screen transition in the digital television receiving apparatus of the third embodiment of the present invention.
Figure 13B:
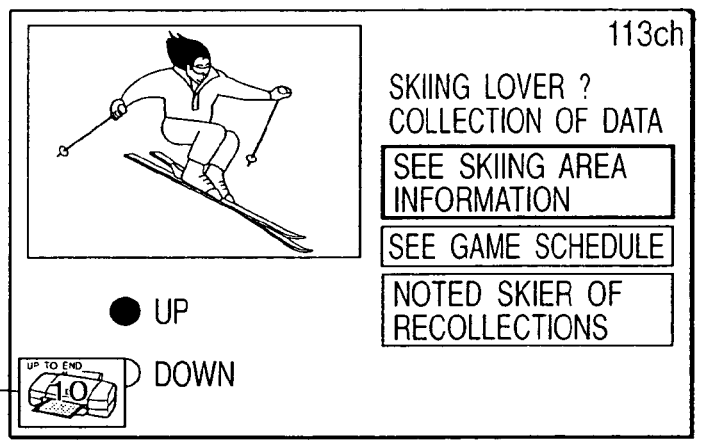
Figure 13C:
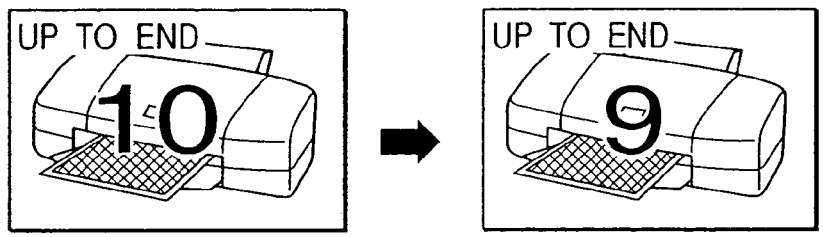

FIG. 13A shows the display of the currently viewed data broadcasting program, and, when the presence of the print contents data is recognized, the screen is shifted as shown in FIG. 13B, wherein an OSD displayed icon 1201 indicates that the transmission of the print contents data relating to the currently viewed channel 113 is to be terminated shortly. FIG. 13C shows a magnified display of the icon display 1201 informing that the transmission of the print contents data is terminated "after 10 seconds".

The CPU 118 starts timing counting by timer means (not shown) from the transmission start time described in the information in 'start_time' in the 'print_time_info' field shown in FIG. 11 and determines the number to be displayed in the icon in FIG. 12C by the time difference between the time count value and the time information described in 'duration' in the 'print_time_info' field shown in FIG. 11. For example, in case the duration shown in FIG. 11 is "0x011100"(=1 hour, 0 minutes, 0 seconds) and the time counted by the timer means is 59 minutes and 50 seconds, the time difference is 10 seconds so that a display as shown in FIG. 13C is given.

Figure 13D:
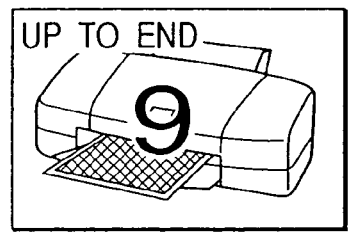
Figure 13E:
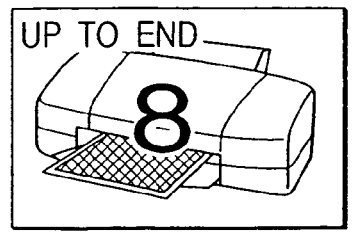
Figure 13F:
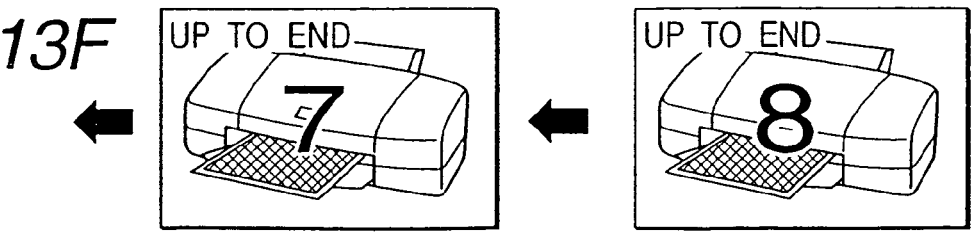

Thereafter the time is counted by timer means (not shown) provided in the CPU 118, and the display is renewed in succession as shown in FIG. 13D at "after 9 seconds", in FIG. 13E at "after 8 seconds" and in FIG. 13F at "after 7 seconds" until "after 0 seconds" when the transmission of the print contents data is terminated.

The above-described icon display allows the user to recognize in advance the start time of transmission of the print contents data, thereby enabling the user to execute preparation of the sheets etc. for the printer. In the present embodiment, the time counting is started at 10 seconds before the start of transmission, but such time count starting time can be arbitrarily selected, for example 20 seconds or 1 minute. In the present embodiment, the time counting is started at 10 seconds before the end of transmission, but it can also be started for example 20 seconds or 1 minute before the end.

The above-described icon display allows the user to recognize in advance the end time of transmission of the print contents data, thereby preventing a situation where the transmission of the print contents data is terminated and the user cannot print such print contents data.

As explained in the foregoing, the digital television receiving apparatus of the third embodiment allows, by the above-described icon display, the user to recognize in advance the start time of transmission of the print contents data, thereby enabling the user to correctly prepare in advance the sheets etc. in the printer.

Also in case the print contents data are identified to be present in the currently received TS data in the display state shown in FIG. 12A or 13A, it is also possible that the CPU 118 generates and transmits an audio message to the audio control unit 110 through the bus 120 whereby the audio output unit 113 outputs an audio message such as "10 seconds to the start of transmission of the print contents data" to the user.

It is furthermore possible and more effective to combine the aforementioned message, mark or icon display with the audio display for informing the user of the presence of the print contents data associated with the currently viewed program or the optimum sheet size for printout and requesting the printing of such print contents data.

Fourth Embodiment

The configuration and operation of the digital television receiving apparatus of a fourth embodiment of the present invention are similar to those of the first embodiment, and will not therefore be explained further. The present embodiment is different from the foregoing first embodiment in executing an OSD display according to the status of the printer.

In the following there will be explained the function. The CPU 118 analyses the PMT described as explained in the foregoing, as in the first embodiment, thereby identifying the presence or absence of the print contents data associated with the currently viewed program. In the presence of the print contents data, it communicates with the printer 132 through the IEEE 1394 I/F 122 thereby entering status data indicating the status of the printer. In case of entry of status data showing any problem in the printer, the CPU 118 causes the screen composition unit 108 to generate OSD display data corresponding such status data and outputs such display data to the image display unit 112 through the display control unit 109. Also in case of entry of status data indicating absence of any problem in the printer, the CPU 118 controls the various units for executing the OSD display as shown in FIGS. 5A, 5B, 5C, 5D, 6A, 6B, 6C and 6D for informing the user of the presence of the print contents data.

The aforementioned problem in the present embodiment includes no connection of the printer 132, no power supply therein, absence of ink therein, absence of sheet therein and sheet jamming therein. In the present embodiment, the OSD display is to be given only in case the printer has any problem, but it is also possible, also in case the printer is in a state operable without any problem, to display such state.

Figure 14:
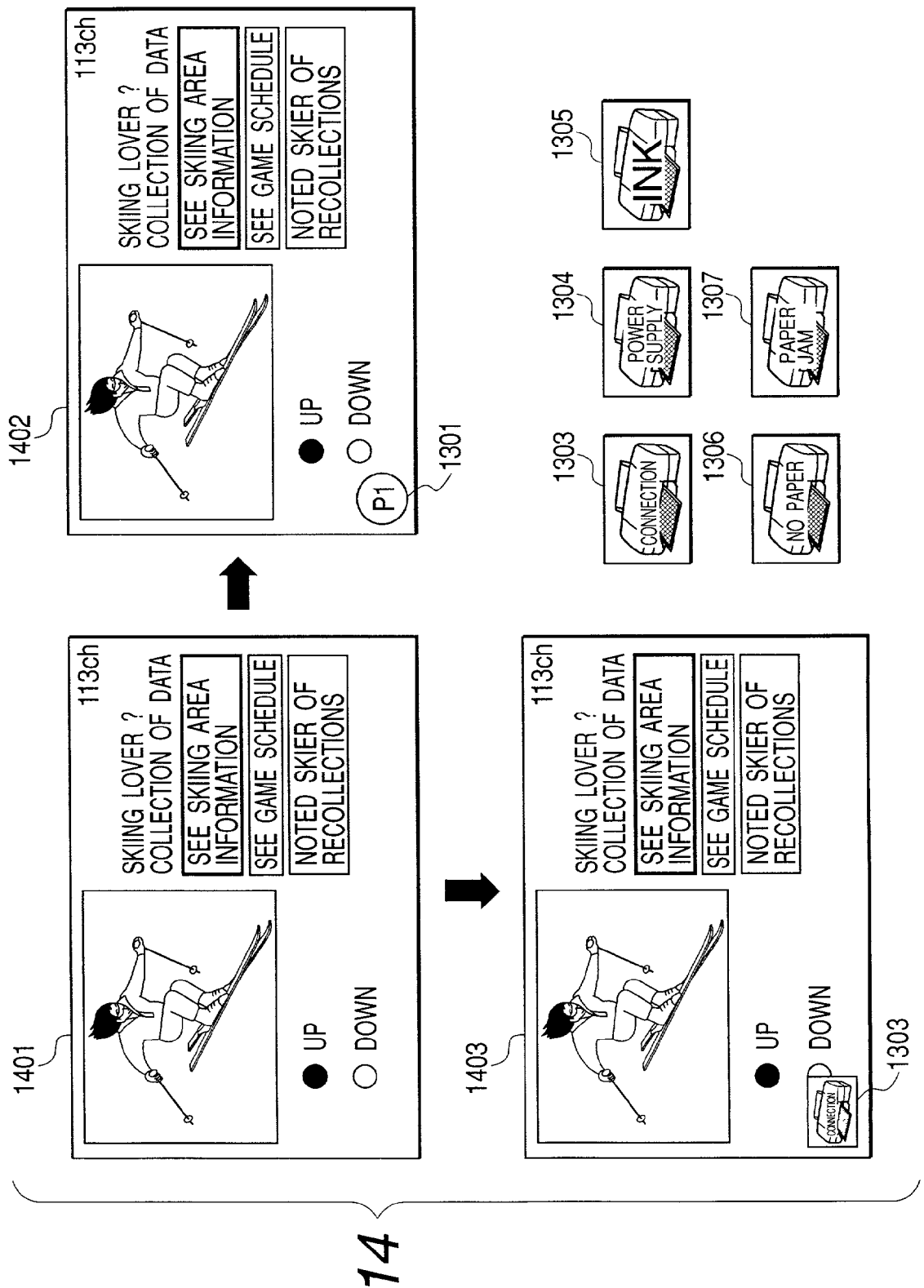
FIG. 14 is a view showing an example of screen transition in the digital television receiving apparatus of a fourth embodiment of the present invention.

FIG. 14 shows examples of OSD display in case the printer has any problem. In FIG. 14, a display 1401 shows the currently viewed data broadcasting, and is shifted to a display 1402 in case the print contents data are identified to be present in the currently received TS data and the printer 132 has any problem. In the display 1402, a mark 1301 is displayed in case any problem is present in the connected printer 132.

Also in a display 1403 in FIG. 14, an icon 1303 is displayed in order to request the connection in case the printer 132 is not connected. Also an icon 1304 is displayed in order to request the turning-on of the power supply in case the power supply of the printer 132 is not turned on. An icon 1305 is displayed in order to request the ink replenishment in case the ink is absent in the printer 132. An icon 1306 is displayed in order to request the sheet replenishment in case the sheet is absent in the printer 132. Also an icon 1307 is displayed in case the printer 132 cannot execute the proper printing because of sheet jamming therein.

As explained in the foregoing, the digital television receiving apparatus of the fourth embodiment allows, by the above-described icon display, the user to recognize the presence of any problem in the printer in case the print contents data are present in the course of the program viewing, thereby preventing a situation where the printing of the print contents data is not possible.

Also similar effects can be obtained in a configuration where the aforementioned problem in the printer 132 is informed to the user by an audio message or by the combination of the icon display and the audio message.

Fifth Embodiment

The configuration and operation of the digital television receiving apparatus of a fifth embodiment of the present invention are similar to those of the first embodiment, and will not therefore be explained further. The present embodiment is different from the foregoing first embodiment in detecting the presence of absence of not only the print contents data but also the data broadcasting associated with the viewed program, and multiplexing an OSD display indicating the presence of the print contents data and the data broadcasting with the screen of the viewed program. The data by the data broadcasting are assumed to be data for displaying information relating to the program.

The CPU 118 analyses the PMT of the currently received channel as explained in the foregoing, and discriminates the presence or absence of the data broadcasting and the print contents data associated with the currently viewed program, based on the descriptor relating the data broadcasting and that relating to the print contents data in the PMT. In case both the data broadcasting and the print contents data are present, the various units are so controlled as to provide OSD displays as shown in FIGS. 15A, 15B, 15C and 15D. Also in case either of the data broadcasting and the print contents data are present, there is provided an OSD display indicating the presence of thus identified data.

Figure 15A:
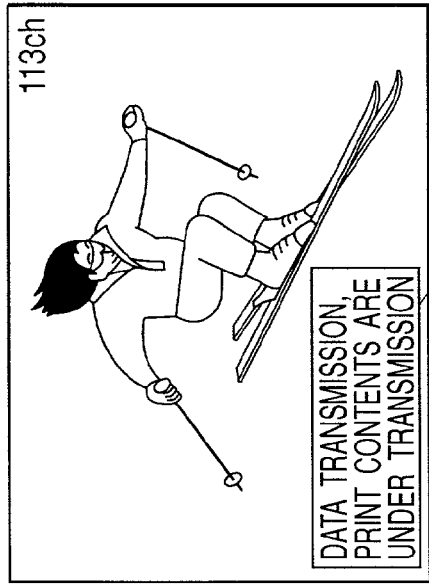
FIGS. 15A, 15B, 15C and 15D are views showing an example of screen transition in the digital television receiving apparatus of a fifth embodiment of the present invention.
Figure 15B:
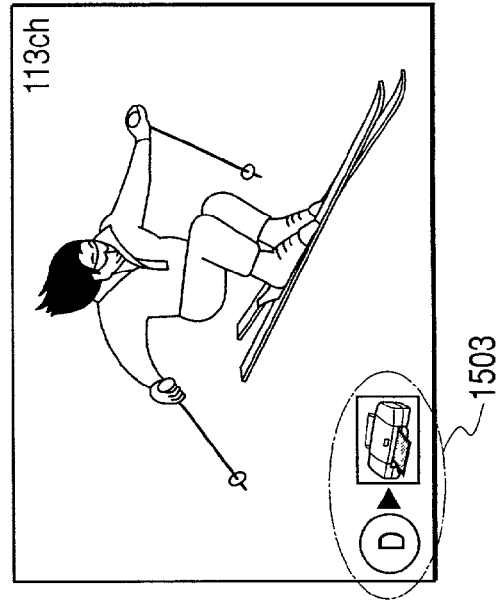
Figure 15C:
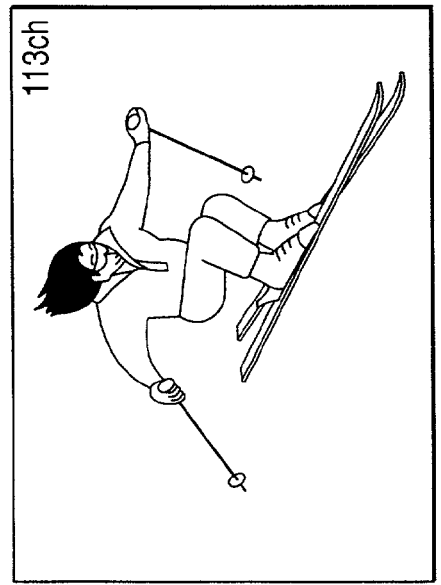
Figure 15D:
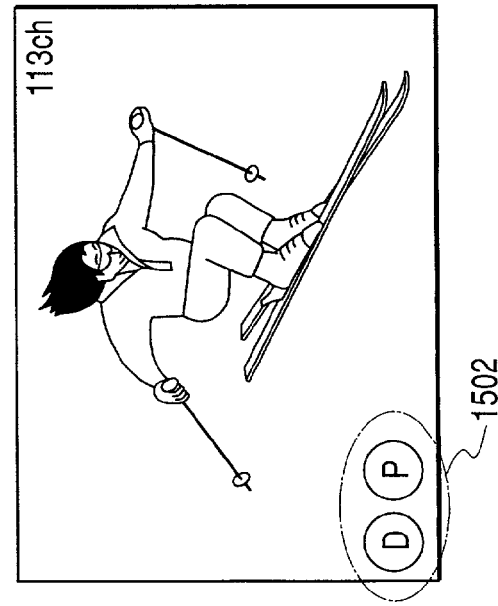

FIGS. 15A, 15B, 15C and 15D show an example of the OSD display to be multiplexed in case the data broadcasting and the print contents data are both present in association with the currently viewed program. FIG. 15A shows the display of the currently viewed image program, and the screen is shifted to a state shown in FIG. 15B in case the data broadcasting and the print contents data are present in association with the currently viewed program, wherein an OSD message 1501 informing the user of the presence of the data broadcasting and the print contents data in the course of program viewing. It is also possible to display a mark 1502 as shown in FIG. 15C or an icon 1503 as shown in FIG. 15D.

Figure 16A:
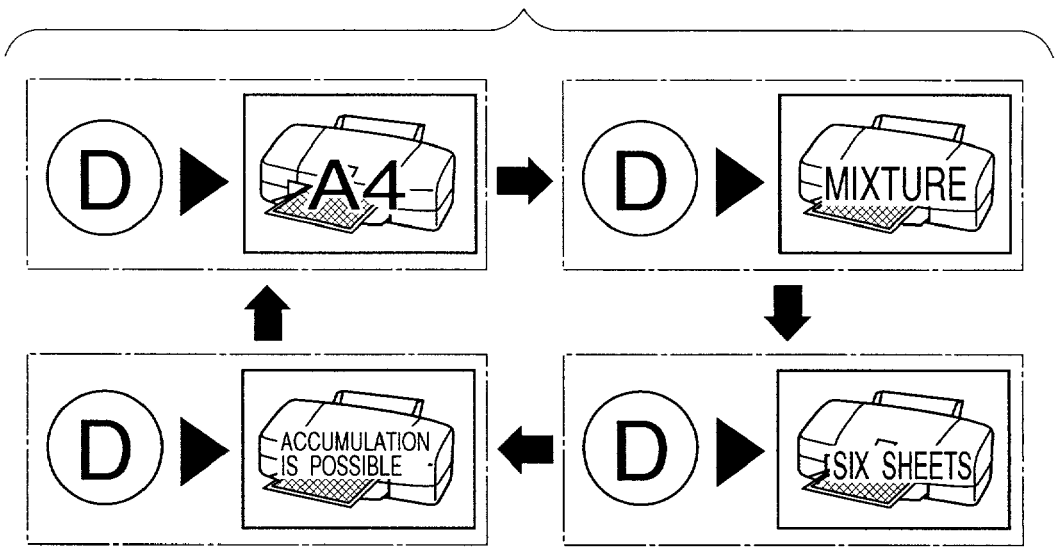
FIGS. 16A, 16B and 16C are views showing an example of icon display in the fifth embodiment of the present invention.

It is also possible to display, in the area of the display 1501, 1502 or 1503 in the image display unit 112, an icon informing the sheet size, type of the print contents, number of print sheets, possibility of accumulation explained in the foregoing second embodiment. An example of such display is shown in FIG. 16A.

Figure 16B:
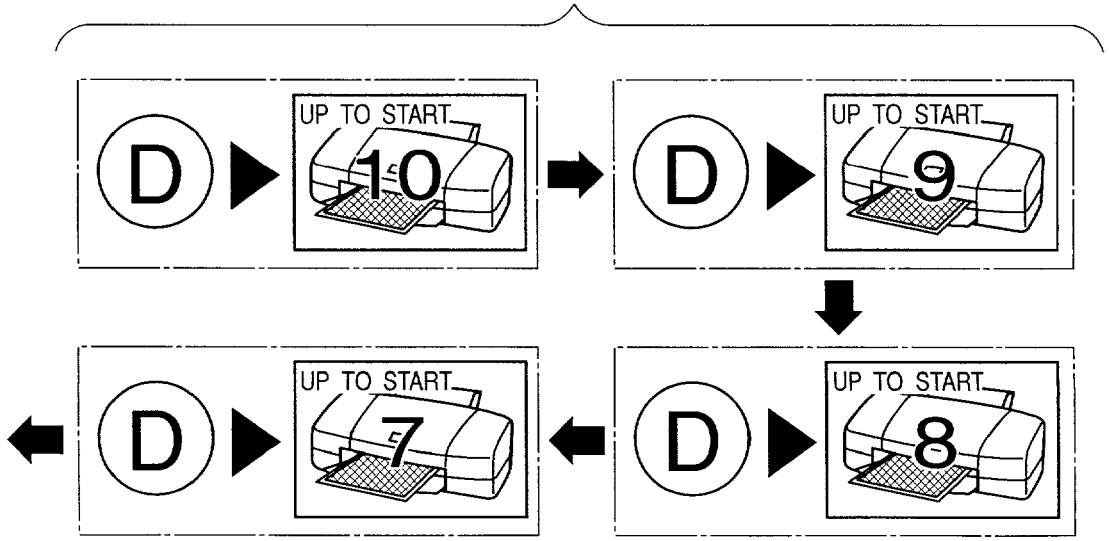

Also in case it is identified that the print contents data relating to the data broadcasting associated with the currently viewed program are to be transmitted, it is also possible to display, in the area of the display 1501, 1502 or 1503 in the image display unit 112, an icon informing the time to the start of transmission of the print contents data explained in the foregoing third embodiment. An example of such display is shown in FIG. 16B. Though not illustrated, it is naturally possible also to display, in a similar manner as in FIG. 16B, an icon informing the time to the end of transmission of the print content data as explained in the foregoing third embodiment.

Figure 16C:
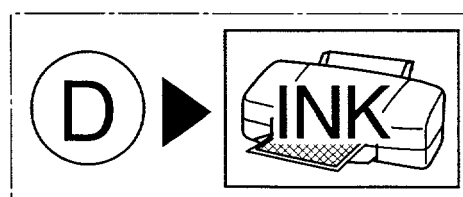

Also in case it is identified that the data broadcasting and the print contents data are present in the currently received TS data and that the printer 132 has any problem, it is possible to display, in the area of the display 1501, 1502 or 1503 in the image display unit 112, an icon explained in the foregoing fourth embodiment, thereby informing the user of the problem present in the printer 132. An example of such display in case ink absence in the printer 132 is shown in FIG. 16C.

As explained in the foregoing, the digital television receiving apparatus of the fifth embodiment allows to avoid a situation where the data cannot be printed even though the data are transmitted, and allows the user to correctly prepare in advance the type and number of the sheets in the printer.

Also similar effects can be obtained in a configuration where the presence of the data broadcasting and the print contents data or the aforementioned problem in the printer 132 is informed to the user by an audio message or by the combination of the icon display and the audio message.

Also in the aforementioned data broadcasting data and print contents data, the display data and the print data need not be transmitted independently but can be composed of a set of data in which display layout information and print layout information are added. In such case, the configuration is so made as to generate the display data and the print data based on such set of data.

Other Embodiments

In the foregoing embodiments, a printer has been explained as the device to be connected to the digital television receiving apparatus for executing the printing, but the present invention is not limited to such configuration and similar effects can also be obtained by employing a facsimile apparatus for executing the printing operation.

Also in the foregoing embodiments, a printer has been explained as the device to be connected to the digital television receiving apparatus for executing the printing, but the present invention is not limited to such configuration and similar effects can also be obtained by employing, for executing the printing operation, a multifunction printer (MFP) having the scanner function, printer function and facsimile function.

Also in the foregoing embodiments, there has been explained a case where the printing device and the digital television receiving apparatus are constructed separately and are mutually connected through an IEEE 1394 interface, but the present invention is not limited to such configuration and similar effects can also be obtained in a configuration in which the printing device and the digital television receiving apparatus are integrally incorporated.

Furthermore, there may be provided a mode of selecting and displaying, on a same image screen, arbitrary ones of the OSD displays explained in the foregoing second, third and fourth embodiments, namely the OSD display showing the detailed information on the print contents data such as the data format or the number of the print sheets, the countdown display of the time to the start (or end) of transmission of the print contents data, and the OSD display corresponding to the printer status, or displaying a list of such OSD displays.

The present invention is applicable not only to a system consisting of plural devices or an apparatus consisting of a single device. Also the objects of the present invention can be attained by supplying the system or the apparatus with a medium such as a memory medium storing program codes of a software realizing the functions of the aforementioned embodiments, and causing the computer (or CPU or MPU) of such system or apparatus to read and execute the program codes stored in the medium such as the memory medium.

In such case, the program codes themselves read from the memory medium realize the functions of the aforementioned embodiments, and the medium such as the memory medium storing the program codes constitutes the present invention. The medium such as the memory medium for supplying the program codes can be, for example, a floppy disk, a hard disk, an optical disk, a magnetooptical disk, a CD-ROM, a CD-R, a magnetic tape, a non-volatile memory card, a ROM or downloading through a network.

The present invention includes not only a case where the functions of the aforementioned embodiments are realized by the execution of the program codes read by the computer but also a case where an operating system or the like functioning on the computer executes all the processes or a part thereof under the instruction of such program codes, thereby realizing the functions of the aforementioned embodiments.

Furthermore, the present invention includes a case where the program codes read from the medium such as memory medium are once stored in a memory provided in a function expansion board inserted in the computer or a function expansion unit connected thereto and a CPU or the like provided in such function expansion board or function expansion unit executes all the processes or a part thereof under the instructions of the program codes, thereby realizing the functions of the aforementioned embodiments.

Figure 18:
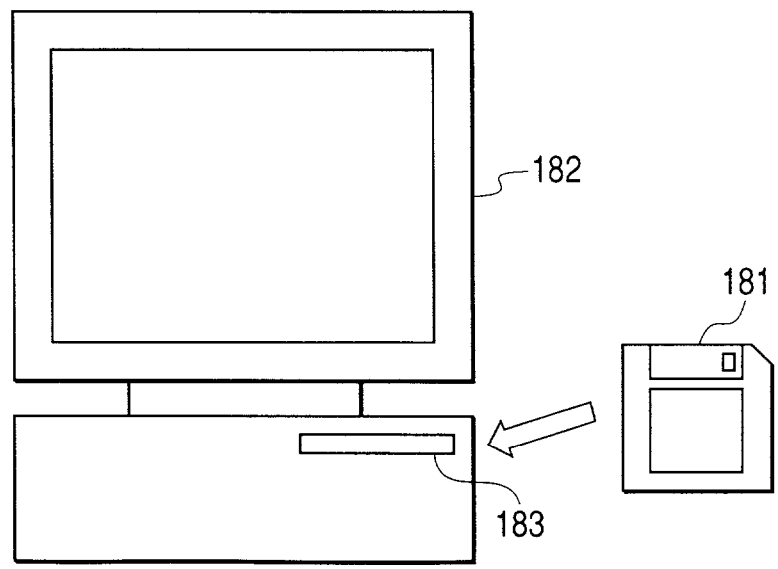
FIG. 18 is a view showing the concept of supply of the program and related data for executing the data reception/output process of the present invention from the memory medium to an apparatus such as a computer.

FIG. 18 is a schematic view showing the concept of supply of the program and the related data for executing the data reception/output method of the present invention from the memory medium to an apparatus such as a computer. The program and related data for executing the data reception/output method of the present invention are supplied by inserting a memory medium 181 such as floppy disk or a CD-ROM into a memory medium drive slot 183 provided in an apparatus 182 such as a computer. Thereafter the program and related data for executing the data reception/output method of the present invention are once installed from the memory medium 181 into a hard disk and then are loaded therefrom into a RAM, or directly loaded in the RAM without installation in the hard disk, whereby the execution of such program and related data is rendered possible.

In such case, the execution of the program for realizing the data reception/output method of the present invention in the digital television receiving apparatus of the first, second, third, fourth and fifth embodiments is rendered possible either by supplying the digital television receiving apparatus with such program and related data through an apparatus such as a computer as shown in FIG. 18, or by storing such program and related data in advance in the digital television receiving apparatus.

Figure 17:
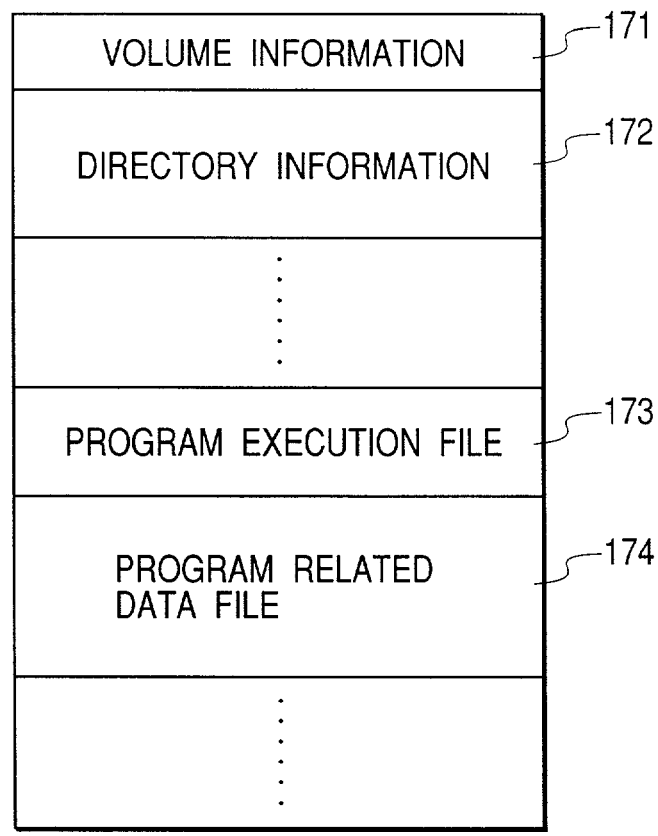
FIG. 17 is a view showing an example of configuration of the memory (storage) content of a memory medium (storage medium) storing program and related data for executing the data reception/output process of the present invention.

FIG. 17 is a schematic view showing an example of the configuration of the memory content in the memory medium storing the program and related data for executing the data reception/output method of the present invention. The memory medium stores, for example, volume information 171, directory information 172, a program execution file 173, and a program related data file 174. The program for executing the data reception/output method of the present invention is formed into program codes according to the control sequence explained in the foregoing.

As explained in the foregoing, the present invention enables the user to easily know the presence or absence of the print contents data associated with the currently viewed program, thereby avoiding a situation where the print contents data cannot be printed even though they are transmitted.

Also the user can easily know the information relating to the print contents data, thereby correctly prepare in advance the type and number of the printing sheets in the printer.

What is claimed is:

1. A television broadcasting data receiving apparatus, comprising:

a receiving unit adapted to receive television broadcasting data which includes image data of a broadcasting program, printing data related to the broadcasting program, and print additional information for notifying a user of an attribute of the printing data;

a print controlling unit adapted to output the printing data included in the television broadcasting data received by said received unit to a printing apparatus;

an acquiring unit adapted to extract the print additional information from the television broadcasting data received by said receiving unit; and a display control unit adapted to generate display data on the basis of the print additional information acquired by said acquiring unit and output, to a display device, the display data together with the image data included in the television broadcasting data received by said receiving unit, wherein the print additional information included in the television broadcasting data includes at least one of information indicating a print sheet size of the printing data.

2. An apparatus according to claim 1, further comprising:

an accepting unit adapted to accept a printing instruction from a user;

wherein said print controlling unit is adapted to perform the output of the printing data to the printing apparatus on the basis of the printing instruction, wherein the print additional information includes information indicating whether there is the printing data, and wherein said accepting unit accepts the printing instruction from the user in a period during which said display controlling unit effects a display which indicates that there is the printing data, on the basis of the print additional information.

3. An apparatus according to claim 1, further comprising:

an accepting unit adapted to accept a storing instruction from a user; and a storage controlling unit adapted to store the printing data in a storage unit on the basis of the storing instruction, wherein the print additional information includes information indicating whether the printing data can be stored, and wherein said accepting unit accepts the storing instruction from the user in a period during which said display controlling unit effects a display which indicates that the printing data can be stored, on the basis of the print additional information.

4. An apparatus according to claim 1, wherein the print additional information includes information for specifying a transmission period of time of the printing data, and wherein said display controlling unit displays a print execution time of the printing data on the basis of the transmission period.

5. An apparatus according to claim 1, wherein in case that there are a plurality of types of print additional information to be displayed by said display device, said display controlling unit displays the respective display data associated with the plurality of types of print additional information so that the display of each of the respective display data is switched over therebetween at a predetermined time interval.

6. A control method of a television broadcasting data receiving apparatus, comprising:

a receiving step of receiving television broadcasting data which includes image data of a broadcasting program, printing data related to the broadcasting program, and print additional information for notifying a user of an attribute of the printing data;

a print controlling step of outputting the printing data included in the television broadcasting data received in said receiving step to a printing apparatus;

an acquiring step of extracting the print additional information from the television broadcasting data received in said receiving step; and a display control step of generating display data on the basis of the print additional information acquired in said acquiring step and outputting, to a display device, display data together with the image data included in the television broadcasting data received in said receiving step, wherein the print additional information included in the television broadcasting data includes at least one of information indicating a print sheet size of the printing data, information indicating the number of the print sheets of the printing data, and information indicating the type of the printing data.

7. A method according to claim 6, further comprising:

an accepting step of accepting a printing instruction from a user;

wherein said print controlling step performs the output of the printing data to the printing apparatus on the basis of the printing instruction, wherein the print additional informational includes information indicating whether there is the printing data, and wherein said accepting step includes accepting the printing instruction from the user in a period during which performance of said display controlling step effects a display which indicates that there is the printing data, on the basis of the print additional information.

8. A method according to claim 6, further comprising:

an accepting step of accepting a storing instruction from a user; and a storage controlling step of storing the printing data in a storage unit on the basis of the storing instruction, wherein the print additional information includes information indicating whether the printing data can be stored, and wherein said accepting step includes accepting the storing instruction from the user in a period during which performance of said display controlling step effects a display which indicates that the printing data can be stored, on the basis of the print additional information.

9. A method according to claim 6, wherein the print additional information includes information for specifying a transmission period of time of the printing data, and wherein said display controlling step includes displaying a print execution time of the printing data on the basis of the transmission period.

10. A method according to claim 6, wherein, in a case in which there are a plurality of types of print additional information to be displayed by said display device, said display controlling step includes displaying the respective display data associated with the plurality of types of print additional information so that the display of each of the respective display data is switched over therebetween at a predetermined time interval.

11. A computer-readable recording medium which stores a computer-executable program for causing a television broadcasting receiving apparatus to execute the control method set out in claim 6.

* * * * *